United States Patent
Lee et al.

(10) Patent No.: US 9,836,111 B2
(45) Date of Patent: Dec. 5, 2017

(54) APPARATUS AND METHOD FOR REPRODUCING CONTENTS IN ELECTRONIC DEVICE

(71) Applicant: Samsung Electronics Co. Ltd., Suwon-si, Gyeonggi-do (KR)

(72) Inventors: Yang-Soo Lee, Yongin-si (KR); Tea-In An, Gumi-si (KR); Moon-Su Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 13/770,696

(22) Filed: Feb. 19, 2013

(65) Prior Publication Data

US 2013/0219188 A1 Aug. 22, 2013

(30) Foreign Application Priority Data

Feb. 16, 2012 (KR) .................. 10-2012-0016091

(51) Int. Cl.
*G06F 21/10* (2013.01)
*G06F 1/32* (2006.01)
*G06F 21/60* (2013.01)

(52) U.S. Cl.
CPC .............. *G06F 1/32* (2013.01); *G06F 1/3203* (2013.01); *G06F 21/10* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 6,327,652 B1 * | 12/2001 | England et al. | 713/2 |
| 7,239,708 B2 * | 7/2007 | England et al. | 380/269 |
| 7,757,101 B2 * | 7/2010 | Nonaka et al. | 713/194 |
| 7,937,766 B2 * | 5/2011 | Takano et al. | 726/30 |
| 8,234,217 B2 * | 7/2012 | Derrenberger | 705/51 |
| 8,527,756 B2 * | 9/2013 | Sandler et al. | 713/168 |
| 2006/0235798 A1 * | 10/2006 | Alkove et al. | 705/59 |
| 2008/0253563 A1 * | 10/2008 | Chang | 380/200 |
| 2010/0241855 A1 * | 9/2010 | Chou | G06F 21/10 713/168 |
| 2012/0005761 A1 | 1/2012 | Caceres | |
| 2012/0011596 A1 | 1/2012 | Kim et al. | |

OTHER PUBLICATIONS

High-bandwidth Digital Content Protection System—Revision 1.3, Intel Corporation, 2006, pp. 1-57.*

* cited by examiner

*Primary Examiner* — Minh Dinh
(74) *Attorney, Agent, or Firm* — Jefferson IP Law, LLP (57) ABSTRACT

An apparatus and a method for outputting contents where an Output Protection Level (OPL) has been set to an extension device in an electronic device are provided. The apparatus includes a secure processor for decrypting and decoding contents where a right to use the contents has been set using a secure Operating System (OS). When receiving an external output request for contents whose external output is not allowed, the secure processor stops generating of decoded data transmitted to an extension device.

12 Claims, 7 Drawing Sheets

APPARATUS AND METHOD FOR REPRODUCING CONTENTS IN ELECTRONIC DEVICE

PRIORITY

This application claims the benefit under 35 U.S.C. §119(a) of a Korean patent application filed in the Korean Intellectual Property Office on Feb. 16, 2012 and assigned Serial No. 10-2012-0016091, the entire disclosure of which is hereby incorporated by reference.

BACKGROUND OF THE INVENTION

1. Field of the Invention

The present invention relates to an apparatus and a method for reproducing contents in an electronic device. More particularly, the present invention relates to an apparatus and a method for preventing unnecessary power consumption.

2. Description of the Related Art

Currently, with advances in the electronic communication industry, an electronic device, such as a mobile communication terminal (i.e., a cellular phone), an electronic scheduler, a Personal Digital Assistant (PDA), and the like, becomes a necessity and serves as an important means for fast exchange of information.

Recently, as contents for an electronic device get settled as an object of creating a high value, contents that can provide an interest to a user are increasing competitively. However, cases of illegally distributing contents are also increasing affecting everyone, especially the user.

To address this issue, an electronic device incorporates a technology for security extension of contents. For example, this technology prepares a TrustZone in a hardware manner on a processor and stores authentication information of contents in the TrustZone. Accordingly, in a case of reproducing contents, an electronic device gives a right to use the contents using authentication information stored in the TrustZone, and the contents to which a right to use the contents has been given can be reproduced by the electronic device.

In addition, the electronic device may output contents reproduced by the electronic device to an extension device, such as a Television (TV) using an external output function, so that a user may reproduce the contents on a larger screen and with improved sound quality via the extension device.

An Output Protection Level (OPL) is set to a portion of contents to which a right to use the contents has been set to limit an output to an extension device.

For example, in a case where the electronic device reproduces contents where an OPL has been set using a High Definition Multimedia Interface (HDMI), an extension device cannot output decoded data of the contents. For example, the electronic device generates a screen (e.g., a black screen, a mosaic screen, and the like) preventing output limitation and outputs the same together with decoded data to the extension device, and the receiving extension device is allowed to output a screen preventing the output limitation on a screen that outputs the decoded data.

With this reason, contents where the OPL has been set cannot be reproduced by the extension device.

However, the electronic device performs an unnecessary operation of providing decoded data to the extension device even under a situation where the extension device cannot output the contents where the OPL has been set. This may be a cause of generating unnecessary power consumption of the electronic device.

In addition, the extension device outputs a screen preventing an output limitation in an overlapped manner when outputting contents where the OPL has been set, thereby decreasing a user's satisfaction.

Therefore, a need exists for an apparatus and a method for preventing unnecessary power consumption, which occurs when an electronic device reproduces contents where an OPL has been set.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for preventing unnecessary power consumption, which occurs when an electronic device reproduces contents where an Output Protection Level (OPL) has been set.

Another aspect of the present invention is to provide an apparatus and a method for stopping a function call used for an external output function when an electronic device reproduces contents where an OPL has been set.

Still another aspect of the present invention is to provide an apparatus and a method for not performing a decrypt process for contents when an electronic device reproduces the contents where an OPL has been set.

In accordance with an aspect of the present invention, an apparatus for reproducing contents in an electronic device is provided. The apparatus includes a secure processor for decrypting and decoding contents where a right to use the contents has been set using a secure Operating System (OS), and for, when receiving an external output request for contents whose external output is not allowed, stopping generating of decoded data transmitted to an extension device.

In an exemplary implementation, the secure processor may stop the generating of the decoded data transmitted to the extension device by stopping at least one of a decrypt process of the contents, a decoding process, and a rendering process.

In an exemplary implementation, the secure processor may generate screen information and output the same to the extension device after stopping the generating of the decoded data transmitted to the extension device, wherein the screen information includes at least one of information informing external output limitation, and screen information of contents where an OPL has not been set.

In an exemplary implementation, the secure processor may control to output the screen information to the extension device using at least one of a High Definition Multimedia Interface (HDMI) and a Wireless Fidelity (Wi-Fi) display.

In accordance with another aspect of the present invention, a method for reproducing contents in an electronic device is provided. The method includes decrypting and decoding contents where a right to use the contents has been set using a secure OS, and when receiving an external output request for contents whose external output is not allowed, stopping the generating of the decoded data transmitted to an extension device.

In an exemplary implementation, the stopping of the generating of the decoded data transmitted to the extension device may stop at least one of a decrypt process of the contents, a decoding process, and a rendering process.

In an exemplary implementation, the method for reproducing contents in the electronic device may further include generating screen information and outputting the same to the extension device after stopping the generation of the decoded data transmitted to the extension device, wherein the screen information includes at least one of information informing external output limitation, and screen information of contents where an OPL has not been set.

In an exemplary implementation, generating the screen information and outputting the same to the extension device may use at least one of an HDMI and a Wi-Fi display.

In accordance with still another aspect of the present invention, an apparatus for reproducing contents in an electronic device is provided. The apparatus includes a secure processor for omitting a decrypt process for contents where a right to use the contents has been set, and generating screen information to output the same to an extension device when the contents where the right to use the contents has been set and which the apparatus desires to reproduce are not outputable to an outside, wherein the screen information includes at least one of information informing external output limitation, and screen information of contents where an OPL has not been set.

In an exemplary implementation, the secure processor may control to output the screen information to the extension device using at least one of an HDMI and a Wi-Fi display.

In an exemplary implementation, the secure processor may omit the decrypt process and a contents decoding process.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention relate to an apparatus and a method for preventing unnecessary power consumption, which occurs when an electronic device reproduces contents where an Output Protection Level (OPL) has been set.

Figure 1:
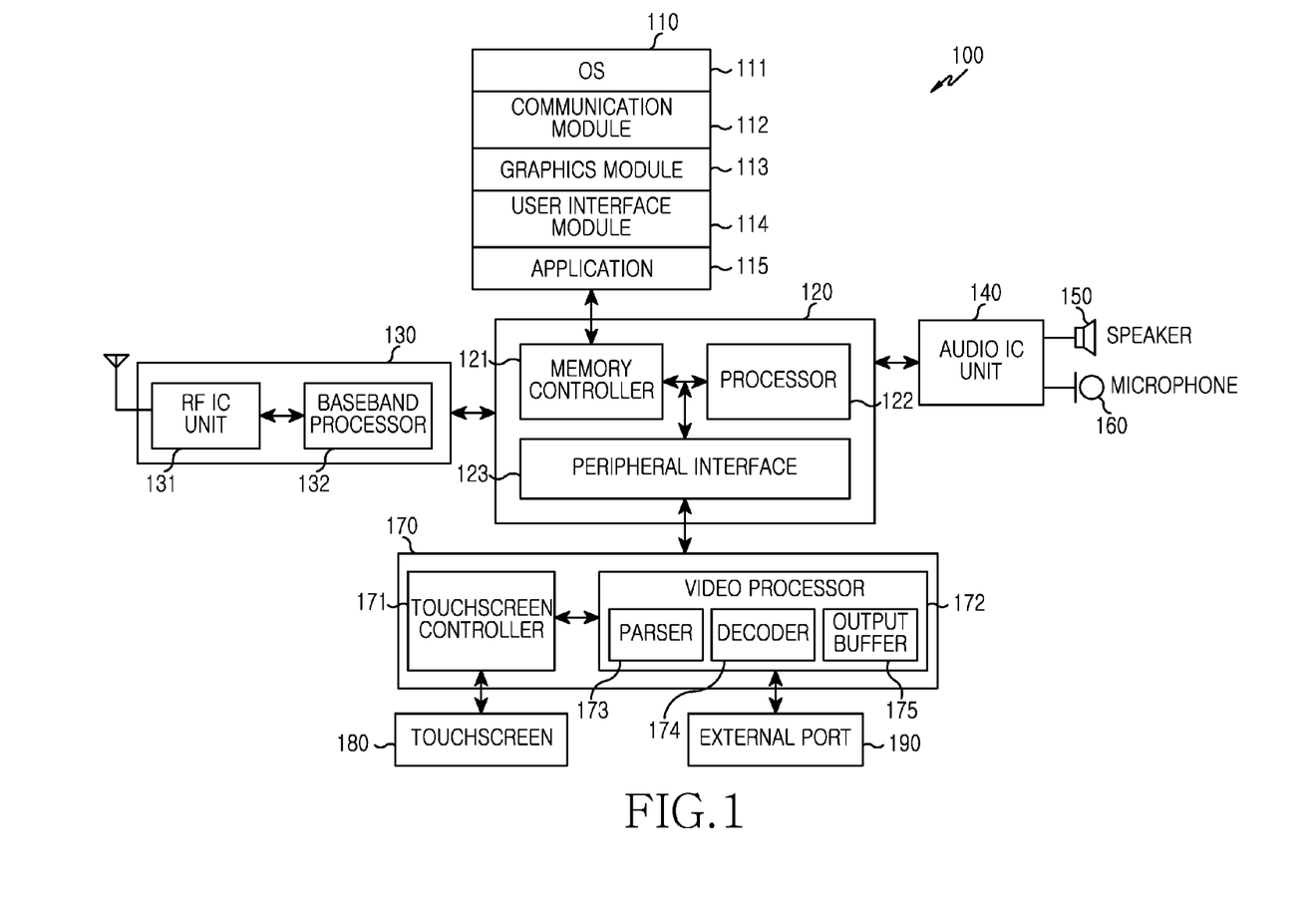
FIG. 1 is a block diagram illustrating an electronic device according to an exemplary embodiment of the present invention.

FIG. 1 is a block diagram illustrating an electronic device according to an exemplary embodiment of the present invention.

Referring to FIG. 1, the electronic device is a device, such as a portable terminal, a mobile phone, a mobile pad, a media player, a tablet computer, a handheld computer, a Personal Digital Assistant (PDA), and the like. In addition, the electronic device 100 may be a device that couples two or more functions of these devices.

The electronic device 100 includes a memory 110, a processor unit 120, a communication unit 130, an audio Integrated Circuit (IC) unit 140, a speaker 150, a microphone 160, an Input/Output (I/O) system 170, a touchscreen 180, and an external port 190. Furthermore, the electronic device 100 may include a plurality of memories and a plurality of external ports.

The processor unit 120 includes a memory controller 121, a processor 122, and a peripheral interface 123. The processor unit 120 may include a plurality of processors. The communication unit 130 includes a baseband processor 132 and a Radio Frequency Integrated Circuit (RF IC) unit 131. The I/O system 170 includes a touchscreen controller 171 and a video processor 172. The above elements communicate with each other via one or more communication buses or signal lines (reference numeral not shown).

These elements may implement their function using hardware, such as one or more ICs, or software, and using a combination of hardware and software.

The electronic device 100 illustrated in FIG. 1 may include a number of elements greater or less than that illustrated in FIG. 1. Alternatively, the electronic device 100 may have configuration different from that illustrated in FIG. 1. Each element is described below.

The memory 110 may be a random access memory, a non-volatile memory including a flash memory, a Read Only Memory (ROM), an Electrically Erasable Programmable Read Only Memory (EEPROM) or a magnetic disc storage device, a Compact Disc-ROM (CD-ROM), Digital Versatile Discs (DVDs) or a different optical storage device, a magnetic cassette, or a combination of all or a portion of these.

The electronic device 100 may further include an attachable storage device that can access the electronic device via a communication network, such as the Internet, an intranet, a Local Area Network (LAN), a Wide LAN (WLAN), a Storage Area Network (SAN), and the like, or a communication network configured using a combination of these. The storage device can access the electronic device 100 via the external port 190. In addition, a separate storage device on a communication network may access the electronic device via the RF IC unit 131.

The memory 110 stores software. A software element includes an Operating System (OS) 111, a communication software module 112, a graphics software module 113, a user interface software module 114, and one or more application softwares 115. Here, the software module may also be expressed as an instruction set.

The OS 111, for example, the OS, such as WINDOWS, LINUX, Darwin, RTXC, UNIX, OS X, and VxWork includes various software elements for controlling a general system operation. The control of the general system operation denotes, for example, memory management and control, storage hardware (device) control and management, power control and management, and the like. The OS 111 also performs a function for smoothing communication between various hardware (devices) and software elements.

The communication software module 112 includes various software elements for processing data transmitted and received via the RF IC unit 131 or the external port 190.

The graphics software module 113 includes various software elements for providing and displaying graphics, for example, a text, a web page, an icon, a digital image, a video, an animation, and the like, on the touchscreen 180.

The user interface module 114 includes various software elements related to a user interface. The user interface module 114 includes content regarding how a state of a user interface changes or a condition under which a user interface state changes.

The application software 115 includes a browser, an e-mail, an instant message, word processing, keyboard emulation, an address book, a touch list, a widget, a JAVA enable application, coding, Digital Right Management (DRM), voice recognition, voice duplication, a position determining function, a location based service, a music player, and the like.

A control in the case where a different element, such as the processor 122 and the peripheral interface 123 included in the processor unit 120, accesses the memory 110, is performed by the memory controller 121.

The external port 190 denotes, for example, a Universal Serial Bus (USB), FIREWIRE, and the like, and is used for being directly connected to a different device, or being indirectly connected to a different device via a network (for example, the Internet, an intranet, a wireless LAN, and the like). In an exemplary embodiment of the present invention, the external port is a port for communicating with an extension device, and may be a High Definition Multimedia Interface (HDMI) terminal, and a Wireless Fidelity (Wi-Fi) display.

The peripheral interface 123 connects an I/O peripheral unit of the electronic device 100 to the processor 122 and the memory 110 (under control of the memory controller). The processor 122 performs various functions for the electronic device 100 using various software programs, and a process and a control for voice communication and data communication. In addition to the general functions, the processor 122 may also execute a specific software module (an instruction set) stored in the memory 110 to perform various specific functions corresponding to the module. The processor 122, the peripheral interface 123, and the memory controller 121 may be implemented in a single chip. In this case, the single chip configuration is the processor unit 120. These elements may be implemented in a single chip or separate chips.

The communication unit 130 includes the RF IC unit 131 and the baseband processor 132. The RF IC unit 131 transmits/receives electromagnetic waves, and converts a baseband signal from the baseband processor 132 to an electromagnetic wave to transmit the same via an antenna (reference numeral not shown). Furthermore, the RF IC unit 131 converts an electromagnetic wave received via the antenna to provide the same to the baseband processor 132. The RF IC unit 131 may include an RF transceiver, an amplifier, a tuner, an oscillator, a digital signal processor, a COding DECoding chip set (CODEC), a Subscriber Identity Module (SIM) card, and the like.

The RF IC unit 131 communicates with a communication network and a different communication device via electromagnetic waves. For example, the RF IC unit 131 communicates with the Internet, an Intranet, a network, a cellular telephone network, and a wireless network, such as a wireless LAN and a Metropolitan Area Network (MAN). In addition, the RF IC unit 131 may communicate with a different electronic device via wireless communication. The wireless communication may be a Time Division Multiple Access (TDMA), a Global System for Mobile Communication (GSM), an Enhanced Data GSM Environment (EDGE), a Code Division Multiple Access (CDMA), a Wideband-CDMA (W-CDMA), Bluetooth, a Voice over Internet Protocol (VoIP), Wi-Fi, Wi-Max, an e-mail, instant messaging, a protocol for a Short Message Service (SMS), or an arbitrary combination of these communication schemes.

As an exemplary embodiment, the RF IC unit 131 frequency-converts an RF signal received via the antenna and provides the converted signal to the baseband processor 132, and frequency-converts a baseband signal from the baseband processor 132 and transmits the converted signal via the antenna. The baseband processor 132 processes a baseband signal. For example, in the CDMA communication, during transmission, the baseband processor 132 channel-codes and spreads data for transmission, and during reception, the baseband processor 132 de-spreads and channel-decodes a reception signal.

The audio IC unit 140 communicates with a user via the speaker 150 and the microphone 160. In other words, the audio IC unit 140 correlates with the speaker 150 and the microphone 160, and provides an audio interface between the user and the electronic device 100. The audio IC unit 140 receives a data signal from the peripheral interface 123 of the processor unit 120, and converts the received data signal to an electric signal. The converted electric signal is transferred to the speaker 150, and the speaker 150 converts the electric signal to a sound wave audible by people and outputs the same. Moreover, a sound wave transferred from people or other sound sources is converted to an electric signal at the microphone 160. The audio IC unit 140 receives the electric signal converted by the microphone 160, converts the received electric signal to an audio data signal, and transmits the converted audio data signal to the peripheral interface 123. The audio data is transmitted to the memory 110 or the communication unit 130 via the peripheral interface 123. The audio IC unit 140 may include an attachable and detachable ear phone, and a jack (not shown) providing an interface with a headphone or a headset. The headset may provide both an output (headphone for one ear or both ears) and an input (microphone). The jack is also called an earphone jack or a headset jack.

The I/O system 170 provides an interface between an input/output unit, such as the touchscreen 180 and a video processor 172, and the peripheral interface 123. The I/O system 170 includes the touchscreen controller 171 and the video processor 172. The video processor 172 processes video data output via the touchscreen 180. For example, the video processor 172 includes a parser 173, a decoder 174, and an output buffer 175, classifies image data into video data and audio data, and decodes the classified data to provide the same to an output buffer.

The touchscreen 180 provides an input/output interface between the electronic device 100 and the user. In other words, the touchscreen 180 transfers the user's touch input to the electronic device 100. The touchscreen 180 shows a visual output from the electronic device 100 to the user. The visual output via the touchscreen 180 is represented in the form of text, graphics, a video, and a combination of these.

The user performs an input operation via a touch event on the touchscreen 180 depending on a haptic contact, a tactile contact, and a combination of these. The touchscreen 180 has a touch detect plane for receiving a user input. For example, a contact point between the touchscreen 180 and a user corresponds to a digit of a finger used for a user touch. In addition, the user may touch the touchscreen 180 using an appropriate object, such as a stylus pen, and the like. When the user performs an input operation via the touchscreen 180, the touchscreen 180 detects a contact on the touchscreen 180 in cooperation with the touchscreen controller 171 and a related software module (an instruction set). The detected contact is converted to interaction corresponding to a user interface object (for example, a soft key) displayed on the touchscreen.

For the touchscreen 180, various display technologies may be used. For example, a Liquid Crystal Display (LCD) technology, a Light Emitting Diode (LED) technology, a Light Emitting Polymer Display (LPD), or an Organic Light Emitting Diode (OLED) technology may be used. The touchscreen 180 and the touchscreen controller 171 may detect the start of a contact, movement of a contact, or stoppage or end of a contact using various touch detect technology, such as capacitive detection, resistive detection, infrared detection, a surface acoustic wave detect technology, and the like. Furthermore, a proximity sensor array technology or other technologies that can detect a contact point on the touchscreen may be used. The electronic device 100 may use a touch detect tablet not representing a visual output and detecting only a touch input.

Other than the touchscreen 180, the electronic device 100 may include a touch pad (not shown) for activating or inactivating a specific function. Unlike the touchscreen 180, the touchpad may not display a visual output but detect only a touch input. The touchpad may have a separate touch detect plane separated from the touchscreen 180, or may be formed on an extension portion of the touch detect plane formed by the touchscreen 180.

A contact via the touchscreen 180 is detected by an operation of the touchscreen controller 171 and a contact detect software. The touchscreen controller 171 transmits/receives an electric signal to/from the touchscreen 180. The contact detect software is stored as a contact detect software module (not shown) in the memory 110. The contact detect software module includes various software configurations for determining various operations related to a contact of the touchscreen 180. The software configurations perform determination as to whether a contact of the touchscreen 180 is made, determination as to movement of a contact, determination as to movement direction and movement time of a contact, and determination as to whether a contact is stopped. The determination as to movement of a contact may include determining movement velocity (magnitude and/or direction included) of a contact, and/or an acceleration (magnitude and/or direction included) of a contact.

The electronic device 100 enables an input by a user's motion, and detects such an input via an operation of the touchscreen controller 171 and a motion detect software. The touchscreen controller 171 transmits/receives an electric signal to/from the touchscreen 180. The motion detect software is stored as a motion detect software module (not shown) in the memory 110. The motion detect software module includes various software configurations for determining a motion related to motion detection on the upper portion of the touchscreen 180. The software configurations perform determination as to a motion start on the upper portion of the touchscreen, determination as to movement of a motion, determination as to movement direction and movement time of a motion, and determination as to whether a motion is stopped. The determination as to movement of the motion may include determining movement velocity (magnitude and/or direction included) of a motion and/or an acceleration (magnitude and/or direction included) of a motion.

Furthermore, the electronic device 100 includes a power system (not shown) for supplying power to the above elements. The power system may include a power source (i.e., an alternating current power source or a battery), a power error detect circuit, a power converter, a power inverter, a charging device and/or a power state display device (i.e., a light emitting diode). In addition, the electronic device 100 may include a power management and control device for performing generation, management, and distribution functions of power.

Figure 2:
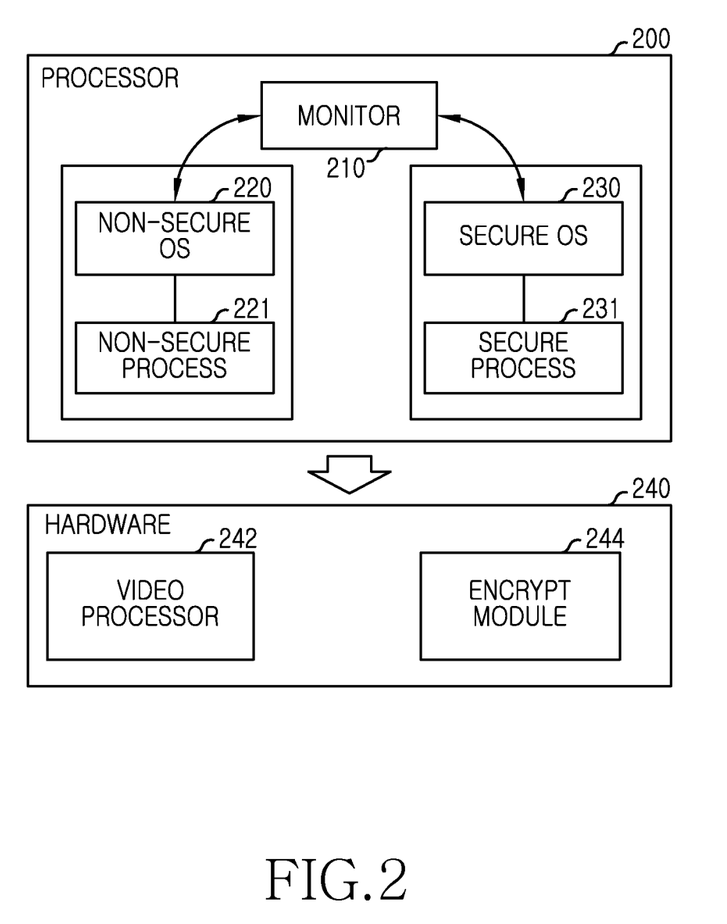
FIG. 2 is a block diagram illustrating an architecture of a secure apparatus according to an exemplary embodiment of the present invention.

FIG. 2 is a block diagram illustrating an architecture of a secure apparatus according to an exemplary embodiment of the present invention.

Referring to FIG. 2, the architecture of the secure apparatus includes a processor 200 and hardware 240.

The processor 200 is a processing means for various programs, and may process a non-secure process 221 or a secure process 231. The processor 200 may provide a monitor program 210 executed at least partially in a monitor mode. The monitor program 210 manages operations between a non-secure region and a secure region. When the processor 200 is viewed from an outside, the monitor program 210 exists in a secure memory. The non-secure region provides a non-secure OS 220, and the non-secure process 221 is implemented via the non-secure OS 220. The secure region provides a secure OS 230, and the secure process 231 is implemented via the secure OS 230. In exemplary implementation, the secure OS 230 provides only functions required for processing in the secure region.

The hardware 240 is an interface component required for proceeding with a relevant process, and may be configured in a software manner. For example, the hardware 240 may include a video processor 242 and an encrypt module 244. The non-secure OS 220 proceeds with the non-secure process 221 using the video processor 242. For example, the non-secure OS 220 may decode image data using the video processor 242 and output the same.

Furthermore, the secure OS 230 proceeds with the secure process 231 using the encrypt module 244. For example, the secure OS 230 may perform decrypt process for contents where a right to use the contents has been set using the encrypt module 244 to obtain the right to use the contents.

In addition, in a case of receiving an external output request for contents where an OPL has been set, the secure OS 230 may stop at least one of decrypting, decoding, and a rendering process for the contents to prevent decoded data transmitted to an extension device from being generated.

Figure 3A:
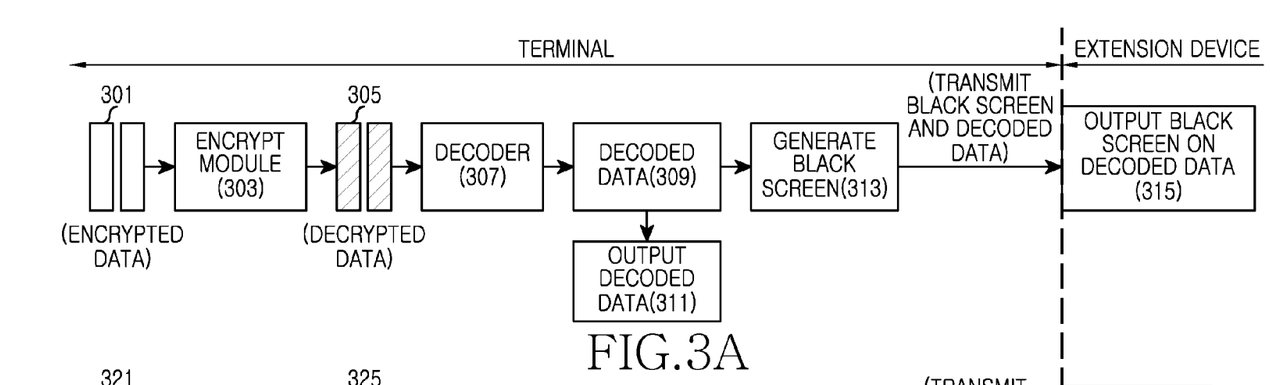
FIGS. 3A through 3C illustrate a comparison of a contents reproducing process of the related art of an electronic device with a contents reproducing process according to an exemplary embodiment of the present invention.
Figure 3B:
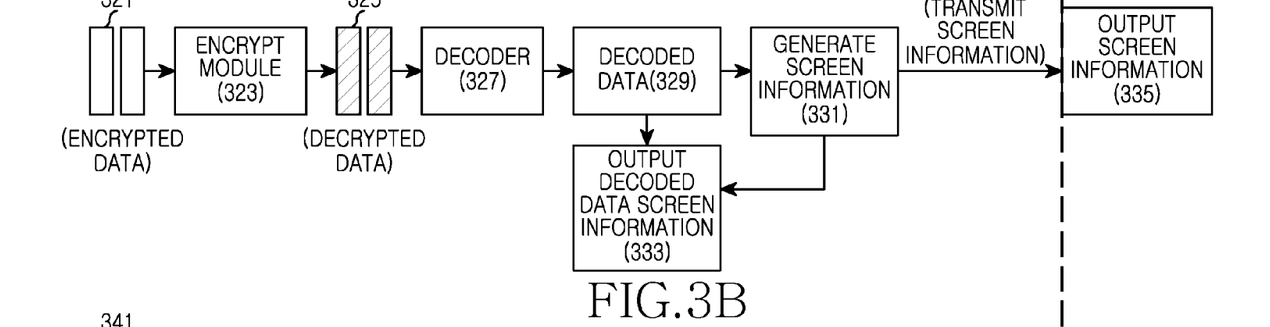
Figure 3C:
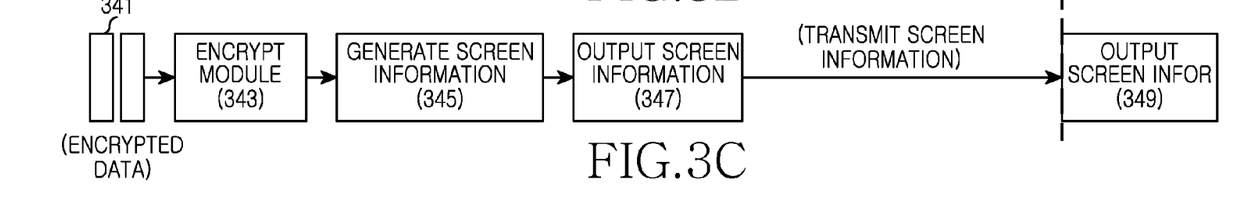

FIGS. 3A through 3C illustrate a comparison of a contents reproducing process of the related art of an electronic device with a contents reproducing process according to an exemplary embodiment of the present invention.

FIG. 3A illustrates a process for reproducing contents where an OPL has been set in a general electronic device according to an exemplary embodiment of the present invention.

Referring to FIG. 3A, contents 301 are contents where a right to use the contents has been set, and are encrypted data (e.g., DRM data). Accordingly, the electronic device releases in step 305 encryption by performing a decrypt process on encrypted contents 301 by an encrypt module 303. At this point, the electronic device performs the decrypt process on the contents using the secure process performed in the secure region (TrustZone) of the processor. This may be a process for being given a right to use the contents. The electronic device that has performed the decrypt process performs the following operation using the non-secure processor.

For example, the electronic device decodes data whose encryption has been released using a decoder 307, and outputs in step 311 the decoded data 309 on the screen. In addition, the electronic device outputs the decoded data to an extension device (e.g., a TV) via an external output function. At this point, the electronic device generates in step 313 a black screen and outputs the same together with the decoded data in order to prevent encrypted contents from being reproduced by the extension device, and the extension device outputs in step 315 the black screen on the decoded data in an overlapped manner. Therefore, the extension device outputs the black screen instead of the decoded data to prevent the contents where the OPL has been set from being reproduced. As described above, the general electronic device unnecessarily transmits the decoded data to the extension device, thereby unnecessarily consuming power.

FIG. 3B illustrates a process for reproducing contents where an OPL has been set in an electronic device according to an exemplary embodiment of the present invention.

Referring to FIG. 3B, the contents 321 are contents where a right to use the contents has been set, and are encrypted data (e.g., DRM data). Accordingly, the electronic device releases in step 325 encryption by performing a decrypt process on encrypted contents 301 by an encrypt module 323. At this point, the electronic device performs the decrypt process on the contents using the secure process performed in the secure region (TrustZone). This may be a process for being given a right to use the contents.

The electronic device that has performed the decrypt process performs the following operation using the non-secure processor. For example, the electronic device decodes data whose encryption has been released using a decoder 327, and outputs in step 333 the decoded data 329 (decoded data of the contents where the OPL has been set) on the screen of the electronic device. In addition, in a case of receiving an external output request for contents where the OPL has been set, the electronic device stops a call of a function used for the external output function to prevent the decoded data from being output to the extension device (e.g., a TV). Instead, the electronic device generates in step 331 predefined screen information (e.g., an external output limitation notice, screen information where the OPL has not been set, and the like) instead of the conventional black screen, and outputs the same to the extension device. For example, in a case of generating information informing that an external output is limited, the electronic device outputs the information on a portion of the screen on which the decoded data is output, and outputs the information to the extension device so that the information may be output in step 335 on an extension device screen. For example, the electronic device reduces power consumption by preventing the decoded data from being output to the extension device. An operation thereof is described with reference to FIG. 5.

In addition, according to another exemplary embodiment, the electronic device decodes data whose encryption has been released using the secure processor and outputs in step 333 the decoded data on the screen of the electronic device. In the case where the secure processor receives an external output request for contents where an OPL has been set, the electronic device stops a call of a function used for the external output function to prevent the decoded data from being output to the extension device (e.g., a TV). In addition, the electronic device may display information informing that an output to the extension device is limited on a portion of an output screen.

FIG. 3C illustrates a process for reproducing contents where an OPL has been set in an electronic device according to an exemplary embodiment of the present invention.

Referring to FIG. 3C, the contents 341 are contents where a right to use the contents has been set, and are encrypted data. For example, in a case of receiving an external output request for the contents 341 where the OPL has been set, the electronic device does not perform a decrypt process that uses an encrypt module 343 of the secure processor but generates in step 345 predefined screen information. For example, the electronic device outputs in step 347 the predefined screen information instead of reproducing the contents, and simultaneously outputs the screen information to an extension device to allow the screen information to also be output in step 349 on an extension device screen. Here, outputting the predefined screen information may be outputting information informing that an external output for the contents is limited, and may outputting a screen of contents where the OPL has not been set instead of the contents where the OPL has been set (e.g., may be outputting a screen of SD contents called 'A' instead of HD contents called 'A').

For example, in a case of receiving an external output request for the contents where the OPL has been set, the electronic device stops a decrypt process for encrypted contents using the secure process performed in the secure region (TrustZone), which is described with reference to FIG. 4.

In addition, in a case of receiving an external output request for contents where the OPL has been set, the electronic device may prevent decoded data output to an extension device from occurring by stopping a decoding process as well as a decrypt process for encrypted contents using the secure process performed in the secure region (TrustZone).

Figure 4:
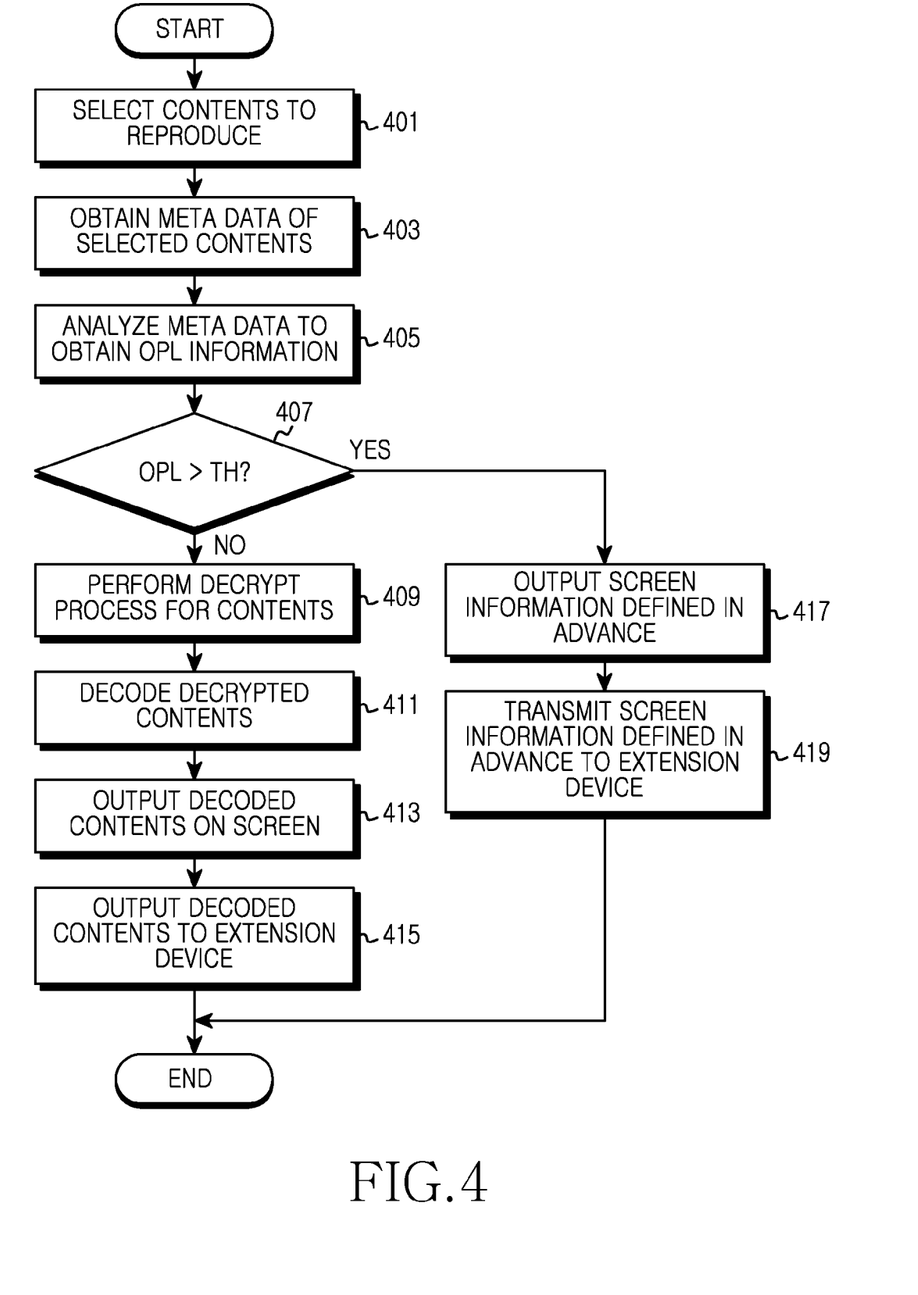
FIG. 4 is a flowchart illustrating a process for reproducing contents in an electronic device according to an exemplary embodiment of the present invention.

FIG. 4 is a flowchart illustrating a process for reproducing contents in an electronic device according to an exemplary embodiment of the present invention.

Referring to FIG. 4, contents are digital contents where a right to use the contents has been set, and include video contents (e.g., High Definition (HD) class contents), image contents, an application, and the like. The electronic device may give a right to use the contents to a user using a process that uses the secure region (TrustZone).

First, the electronic device assumes that it has received an external output request for the contents, selects contents to reproduce in step 401, and proceeds to step 403 to obtain meta data of the selected contents.

Thereafter, the electronic device proceeds to step 405 to analyze the meta data to obtain OPL information, and proceeds to step 407 to compare the obtained OPL with a predefined threshold. Here, the meta data of the contents denotes data recording attribute information of the contents, and generally includes a format type, resolution information, capacity information, an OPL, and the like, of the contents. The OPL denotes a level limiting output of contents to an extension device. Outputting contents having a level equal to or greater than a threshold to an extension device using an HDMI terminal, a Wi-Fi display, and the like, is limited.

When determining an OPL less than the predefined threshold (determining that the contents are contents outputable to the extension device) in step 407, the electronic device proceeds to step 409 to perform a decrypt process for the contents.

At this point, the electronic device performs the decrypt process for the contents using the process performed in the secure region. This may be a process for being given a right to use the contents.

The electronic device that has performed the decrypt process for the contents proceeds to step 411 to decode the decrypted contents, and proceeds to step 413 to output the decoded contents on the screen. At this point, the electronic device classifies the decrypted contents into image data and audio data. Thereafter, the electronic device may perform a decoding process and a rendering process on the classified image data and audio data.

The electronic device that has output the decoded contents as described above proceeds to step 415 to output the decoded data to an extension device to allow the decoded data to be output on the screen of the extension device. At this point, the electronic device may output the decoded data to the extension device using an HDMI terminal and a Wi-Fi display.

In contrast, when determining an OPL equal to or greater than the predefined threshold (determining that the contents are contents whose output to the extension device is limited) in step 407, the electronic device proceeds to step 417 to output screen information defined in advance. Here, the screen information denotes information informing an output limitation or information that can replace an image of contents whose output is limited. In a case where an extension device outputs contents whose output has been protected, the extension device outputs an image processed using a mosaic, a black screen, and the like. However, exemplary embodiments of the present invention replace the processed image by predefined screen information.

Thereafter, the electronic device proceeds to step 419 to transmit predefined screen information to the extension device, and ends the present algorithm.

For example, in a case of reproducing contents whose output to the extension device has been limited using an external output function, the electronic device of FIG. 4 may stop a decrypt process for the contents using a process performed in the secure region, and output the predefined screen information to the screens of the electronic device and the extension device.

In addition, in another exemplary embodiment, in a case of reproducing the contents whose output to the extension device has been limited using an external output function, the electronic device of FIG. 4 may prevent decoded data output to the extension device from occurring by stopping a decrypt process and a decoding process for the contents using a process performed in the secure region, and output the predefined screen information on the screens of the electronic device and the extension device.

Figure 5:
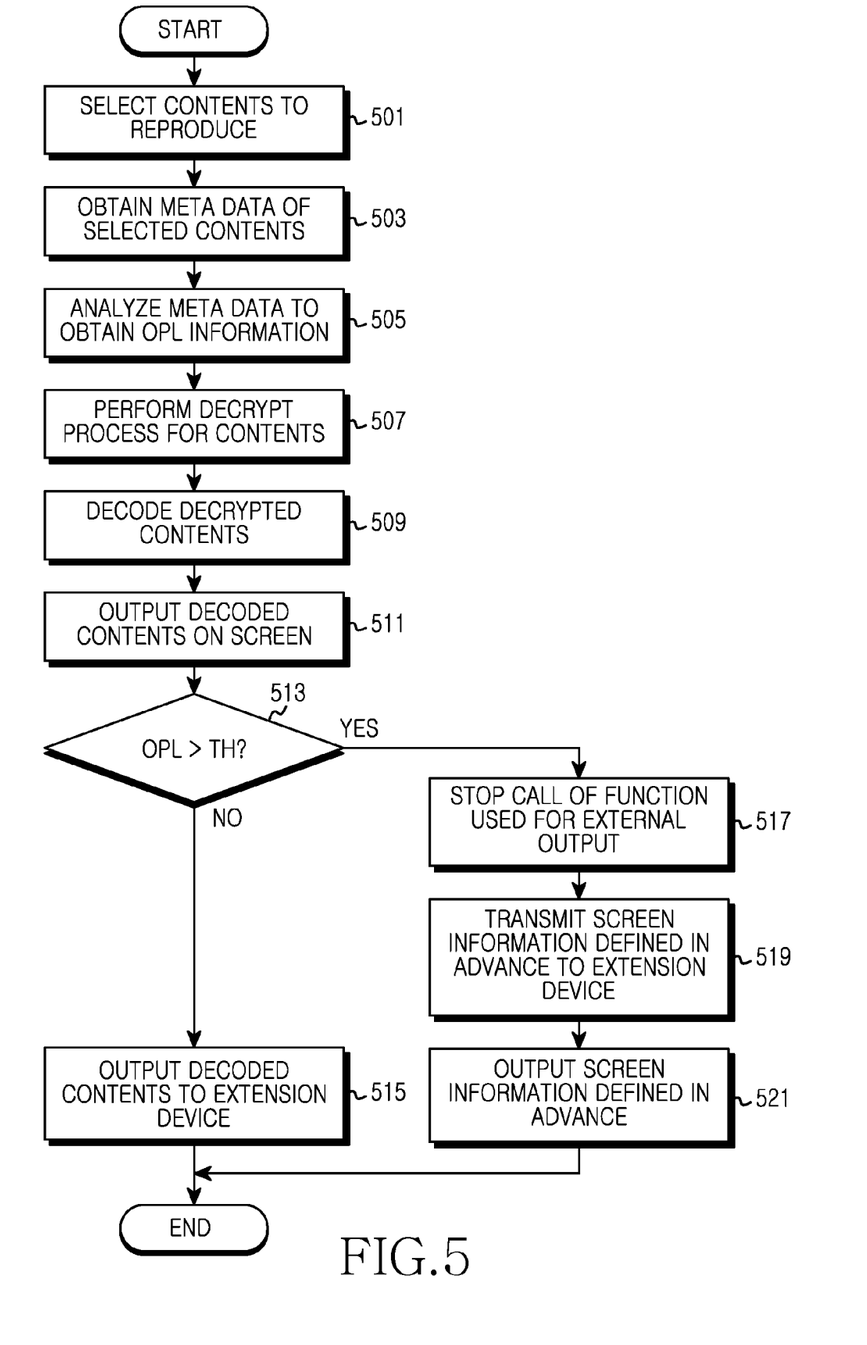
FIG. 5 is a flowchart illustrating a process for reproducing contents in an electronic device according to an exemplary embodiment of the present invention.

FIG. 5 is a flowchart illustrating a process for reproducing contents in an electronic device according to an exemplary embodiment of the present invention.

Referring to FIG. 5, as described above, the contents are digital contents where a right to use the contents has been set, and include video contents, image contents, an application, and the like. The electronic device includes a processor unit that uses TrustZone, and can give a right to use the contents using a secure region of the processor unit.

First, the electronic device assumes that it has received an external output request for contents, and selects contents to reproduce in step 501, and proceeds to step 503 to obtain meta data of the selected contents.

Thereafter, the electronic device proceeds to step 505 to analyze the meta data to obtain OPL information, and proceeds to step 507 to perform a decrypt process for the contents. In addition, the electronic device may analyze license information besides the meta data of the contents to obtain the OPL.

At this point, the electronic device performs a decrypt process for the contents using a process performed in the secure region (TrustZone). This may be a process for being given a right to use the contents.

The electronic device that has performed the decrypt process for the contents proceeds to step 509 to decode the decrypted contents, and proceeds to step 511 to output the decoded contents on the screen. At this point, the electronic device classifies the decrypt contents into image data and audio data. Thereafter, the electronic device may perform a decoding process and a rendering process on the classified image data and audio data using a process performed in the secure region.

The electronic device that has output the decoded contents as described above proceeds to step 513 to compare the OPL information obtained in step 505 with a predefined threshold to determine whether output of contents to reproduce to an extension device is limited. Here, the contents whose output to the extension device is limited denote contents which are reproducible only by the electronic device and whose transmission to the extension device using an HDMI terminal, a Wi-Fi display, and the like, is limited.

When determining an OPL less than the predefined threshold (e.g., determining that the contents are contents outputable to the extension device) in step 513, the electronic device proceeds to step 515 to output the decoded data to the extension device.

In contrast, when determining an OPL equal to or greater than the predefined threshold (e.g., determining that the contents are contents whose output to the extension device is limited) in step 513, the electronic device proceeds to step 517 to stop a call of a function used for an output function to the extension device. This is for preventing decoded data from being output (transmitted) to the extension device via an external port from the electronic device.

The electronic device proceeds to step 519 to obtain screen information defined in advance to transmit the screen information to the extension device, and proceeds to step 521 to output the screen information defined in advance to a portion of the screen on which the decoded data is output to inform that output to the extension device is limited. Thereafter, the electronic device ends the present algorithm.

Figure 6:
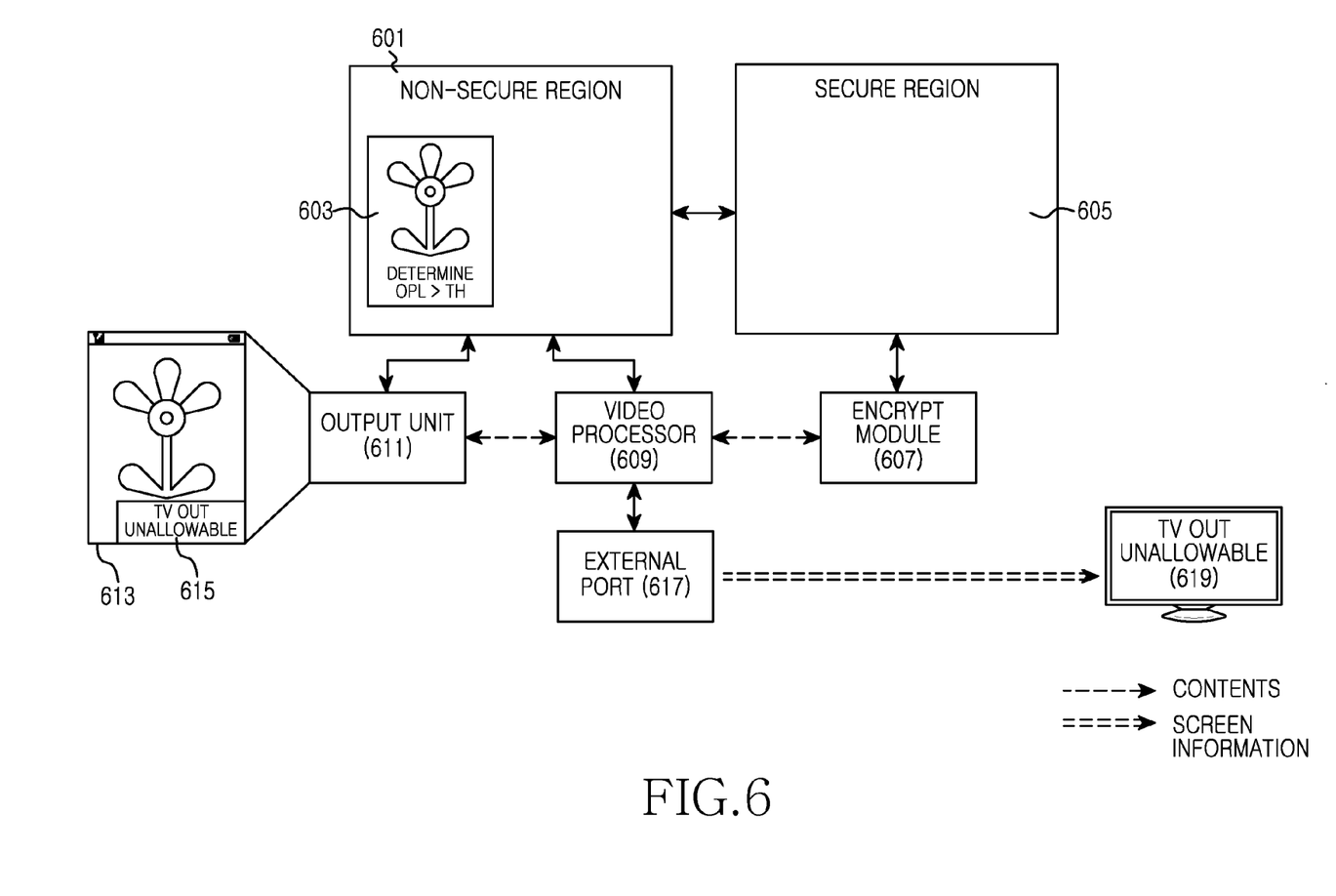
FIG. 6 illustrates a process for reproducing contents in an electronic device according to an exemplary embodiment of the present invention.

FIG. 6 illustrates a process for reproducing contents in an electronic device according to an exemplary embodiment of the present invention.

Referring to FIG. 6, a processor of the electronic device is divided into a non-secure region 601 where a non-secure processor, such as an OS, operates and a secure region 605 where a secure processor, such as a processor giving a right to use the contents, operates. The processor divided into the non-secure region 601 and the secure region 605 is also called an application processor. In addition, the electronic device assumes that it has received an external output request for contents.

First, in a case of reproducing contents where a right to use the contents has been set, the electronic device determines an OPL of the contents via the non-secure region 601 of the processor to determine in step 603 whether the relevant contents are outputable to the outside. At this point, the electronic device may determine whether the relevant contents are outputable to the outside by determining meta information and a license key of the contents.

When the relevant contents are not outputable to the outside, the secure region 605 of the processor performs a decrypt process via an encrypt module 607 to give a right to use the contents, and informs the non-secure region 601 that the relevant contents are not outputable to the outside. Accordingly, the non-secure region 601 decodes contents via a video processor 609 to output in step 613 the decoded data via an output unit 611. In addition, the non-secure region 601 prevents the decoded data from being output via an external port 617, and outputs in step 619 predefined screen information (e.g., an external output limitation notice, screen information where the OPL has not been set, and the like) to an extension device. The extension device may not receive decoded data of contents but output only received screen information. At this point, the non-secure region 601 may stop a call of a function used for external output of the decoded data to prevent the decoded data from being output via the external port 617, and output in step 615 screen information together with the decoded data 613.

In contrast, when the relevant contents are outputable to the outside, the secure region of the processor performs a decrypt process via the encrypt module to give a right to use the contents, and informs the non-secure region that the relevant contents are outputable to the outside. Accordingly, the non-secure region decodes contents via the video processor to output the decoded data via the output unit. In addition, the non-secure region outputs the decoded data to the extension device via the external port to allow the decoded data to be output also on the screen of the extension device.

Figure 7:
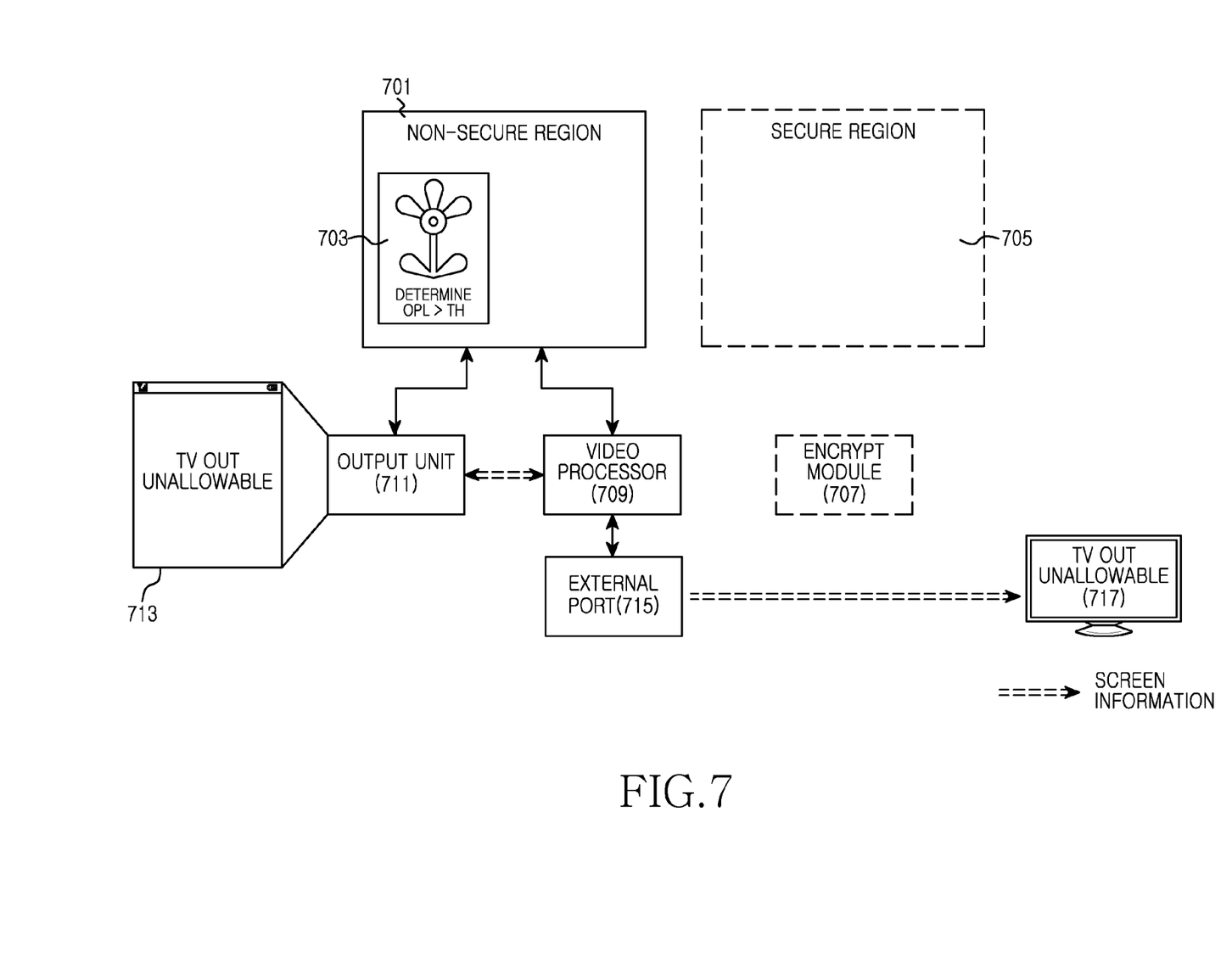
FIG. 7 illustrates a process for reproducing contents in an electronic device according to an exemplary embodiment of the present invention.

FIG. 7 illustrates a process for reproducing contents in an electronic device according to an exemplary embodiment of the present invention.

Referring to FIG. 7, a processor of the electronic device is divided into a non-secure region 701 where a non-secure processor, such as an OS, operates and a secure region 705 where a secure processor, such as a processor giving a right to use the contents, operates. The processor divided into the non-secure region 701 and the secure region 705 is also called an application processor. In addition, the electronic device assumes that it has received an external output request for contents. FIG. 7 also illustrates TV out unallowable decoded data 713, an output unit 711, a video processor 709, an external port 715 and output of predefined screen information, in step 717, to an extension device.

First, in a case of reproducing contents where a right to use the contents has been set, the electronic device determines an OPL of contents via the non-secure region 601 of the processor to determine in step 703 whether the relevant contents are outputable to the outside. At this point, the electronic device may determine whether the relevant contents are outputable to the outside by determining meta information and a license key of contents.

When the relevant contents are not outputable to the outside, the secure region 705 of the processor does not perform a decrypt process via an encrypt module 707. The secure region and the encrypt module illustrated in dotted lines represent a state where the decrypt process is not performed.

In addition, when the relevant contents are not outputable to the outside, the secure region 705 of the processor may stop the decrypt process and the decoding process for the contents to prevent decoded data output to an extension device from occurring.

As described above, an electronic device according to exemplary embodiments of the present invention stops a call of a function used for an external output function, and does not perform a decrypt process for contents when reproducing the contents where an OPL has been set, thereby preventing unnecessary power consumption.

It will be appreciated that exemplary embodiments of the present invention according to the claims and description in the specification can be realized in the form of hardware, software or a combination of hardware and software. Any such software may be stored in a non-transient computer readable storage medium. The computer readable storage medium stores one or more programs (i.e., software modules) comprising instructions, which when executed by one or more processors in an electronic device, cause the electronic device to perform a method of exemplary embodiments of the present invention. Any such software may be stored in the form of volatile or non-volatile storage, such as a storage device like a Read Only Memory (ROM), whether erasable or rewritable or not, or in the form of memory, such as a Random Access Memory (RAM), memory chips, device or integrated circuits or on an optically or magnetically readable medium such as a Compact Disc (CD), a Digital Video Disc (DVD), a magnetic disk, a magnetic tape, or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing an apparatus or a method as claimed in any one of the claims of this specification and a machine-readable storage storing such a program. Furthermore, such programs may be conveyed electronically via any medium, such as a communication signal carried over a wired or wireless connection and exemplary embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device for reproducing content, the electronic device comprising:
    a display;
    an interface circuitry configured to communicate with an external output device; and
    at least one processor operatively coupled to the display and the interface circuitry, the at least one processor configured to:
        determine whether a user input for a request to transmit a secure content to the external output device is received,
        compare an Output Protection Level (OPL) of the secure content with a predefined threshold when the user input is received,
        if the OPL is determined to be less than the predefined threshold, decrypting and decoding the secure content and control the interface circuitry to transmit the decrypted and decoded secure content to the external output device, and
        if the OPL is determined to be equal to or greater than the predefined threshold, control the display to display screen information indicating that external output is limited without decrypting and decoding the secure content and control the interface circuitry to transmit the screen information to the external output device.

2. The electronic device of claim 1, wherein the at least one processor is further configured to stop a call of a function used for transmitting the secure content to the external output device when the screen information is transmitted to the external output device.

3. The electronic device of claim 1,
    wherein the OPL comprises a level limiting output of content to the external output device.

4. The electronic device of claim 1, wherein the at least one processor is further configured to determine whether the secure content is limited to reproduction at the external output device by comparing the OPL with the predefined threshold.

5. The electronic device of claim 1,
    wherein, when the OPL is determined to be less than the predefined threshold, the at least one processor is further configured to determine that the secure content is not limited to reproduction at the external output device, and
    wherein, when the OPL is determined to be equal to or greater than the predefined threshold, the at least one processor is further configured to determine that the secure content is limited to reproduction at the external output device.

6. The electronic device of claim 1, wherein the at least one processor is further configured to control to communicate with the external output device using at least one of a High Definition Multimedia Interface (HDMI) and a Wireless Fidelity (Wi-Fi) display.

7. A method for reproducing content in an electronic device, the method comprising:
    determining whether a user input for a request to transmit a secure content to an external output device is received;
    comparing an Output Protection Level (OPL) of the secure content with a predefined threshold;
    if the OPL is determined to be less than the predefined threshold, decrypting and decoding the secure content and transmitting the decrypted and decoded secure content to the external output device; and
    if the OPL is determined to be equal to or greater than the predefined threshold, outputting screen information indicating that external output is limited without decrypting and decoding the secure content, and transmitting the screen information to the external output device.

8. The method of claim 7,
    wherein the OPL includes a level limiting output of content to the external output device.

9. The method of claim 7, further comprising stopping a call of a function used for transmitting the secure content to the external output device when the screen information is transmitted to the external output device.

10. The method of claim 8, further comprising determining whether the secure content is limited to reproduction at the external output device by comparing the OPL with the predefined threshold.

11. The method of claim 7, further comprising:
    determining, when the OPL is determined to be less than the predefined threshold, that the secure content is not limited to reproduction at the external output device, and
    determining, when the OPL is determined to be equal to or greater than the predefined threshold, that the secure content is limited to reproduction at the external output device.

12. The method of claim 8, wherein the screen information is outputted to the external output device using at least one of a High Definition Multimedia Interface (HDMI) and a Wireless Fidelity (Wi-Fi) display.

* * * * *